United States Statutory Invention Registration [19]

[11] Reg. Number: H808

Siemer et al. [43] Published: Aug. 7, 1990

[54] REMOVAL OF I, RN, XE AND KR FROM OFF GAS STREAMS USING PTFE MEMBRANES

[75] Inventors: Darryl D. Siemer; Leroy C. Lewis, both of Idaho Falls, Id.

[73] Assignee: The United States of America as represented by the United States Department of Energy, Washington, D.C.

[21] Appl. No.: 256,812

[22] Filed: Oct. 12, 1988

[51] Int. Cl.[5] ..... B01D 53/36; C01B 23/00

[52] U.S. Cl. ..... 423/262; 423/237; 423/241

[58] Field of Search ..... 423/241, 262, 239

[56] References Cited

U.S. PATENT DOCUMENTS 3,658,467 4/1972 Maeck .
4,220,632 9/1980 Pence et al. .

OTHER PUBLICATIONS

Siemer et al., "Silicone Rubber Tubing for Elimination of Background Conductivity in Anion Chromatography", Anal. Chem., 1984, vol. 56, p. 1033.
Siemer et al., "Carbone Dioxide Permeable Tubing for Postsuppression in Ion Chromatography", Anal. Chem., 1984, vol. 56, pp. 1085–1089.
Hampson et al., "Melt Refining of EBRII Fuels", Nuclear Metallurgy, vol. 15, pp. 62–65, 1969.

*Primary Examiner*—Robert L. Stoll
*Assistant Examiner*—Joseph D. Anthony
*Attorney, Agent, or Firm*—Hugh W. Glenn; Robert J. Fisher; William R. Moser

[57] ABSTRACT

A process for removing I, R, Xe and Kr which involves the passage of the off gas stream through a tube-in-shell assembly, whereby the tubing is a PTFE membrane which permits the selective passages of the gases for removing and isolating the gases.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REMOVAL OF I, RN, XE AND KR FROM OFF GAS STREAMS USING PTFE MEMBRANES

CONTRACTUAL ORIGIN OF THE INVENTION

The U.S. Government has rights in this invention pursuant to Contract No. DE AC07-79-ID01675 between the U.S. Department of Energy and Exxon Nuclear Idaho Company.

BACKGROUND OF THE INVENTION

This invention relates to countercurrent extraction methods and in particular, to a means for separating gaseous elements from the liquid phase components of a waste gas stream.

Removal of gaseous radioactive iodines and other elemental species from a waste gas stream to prevent their entrance to the atmosphere is of considerable importance. It is primarily by such means that one can prevent the contamination of surfaces to which these substances may adhere and also to prevent ingestion by humans and animal life. The radioactive gaseous elements of concern here can include inorganic species such as various elemental substances, as well as organic species such as methyliodide which may be present in waste gases which may comprise radioactive off gases from nuclear fuel reprocessing plants. These radioactive materials are formed in the nuclear reactor fuel by the fission of the fuel material. If these off gases can be individually collected from the gaseous effluent, they might possibly be used for other unrelated purposes.

Various means have been used in the past for filtering out and/or trapping such radioactive materials in the off gas stream, for example, materials such as copper and other metals which react with iodine have been used to adsorb the iodine that is not stopped by mechanical filtration. Silver nitrate supported on an inert substrate reacts with the iodine species to form silver iodide. Another material commonly used in cleanup systems of reactor containment atmospheres for fission products is charcoal impregnated with iodine and potassium iodide. Various inefficiencies and limitations in the use of these different means for separating such effluent gaseous mixtures into their component gases have indicated the need for a more versatile and more efficient means of separating the individual gases from the effluent.

SUMMARY OF THE INVENTION

Therefore an object of the subject invention is a method for adsorbing and retaining both inorganic and organic radioactive gaseous species.

Another object of the subject invention is a method for separating radioactive gaseous materials from a gaseous effluent while simplifying the use of cryogenic methods.

Still another object of the subject invention is a method for separating iodine, xenon, krypton and radon from a gaseous effluent in the presence of oxides of nitrogen.

These and other objects are attained through the use of the subject invention whereby the gaseous elements of iodine, xenon, krypton and radon may be individually separated from a gaseous effluent even though nitrogen oxides are present, by passing the gaseous effluent into a tube-in-shell countercurrent mass transfer apparatus through tubing formed of expanded microporous, polytetrafluoroethylene (PTFE) tubing. An aqueous acceptor stream flowing in the shell of the first countercurrent exchange apparatus receives substantially all of the trace level gaseous components present in the original gas stream. Only a saturation-limited fraction of the bulk carrier gases, $N_2$ and $H_2$, in a typical off gas stream enters the aqueous acceptor stream, so a gross separation between the carrier gases and the trace gases occurs in the first exchanger. This aqueous stream then becomes the donor stream while passing through the second countercurrent exchange apparatus. The majority of the $NO_2$ dissolved in the water reacts to form involatile (ionic) nitric and nitrous acids which are discarded along with the water after it passes through the second exchanger. The second exchanger transfers the remaining gases, (radon, xenon, krypton, iodine, and some NO) to a recirculating nitrogen "extractant" gas stream pumped between the second and third exchangers.

In the third exchanger, the trace-level gases are transferred to a recirculating stream of an aqueous reductant, such as a dilute sodium sulfite solution which is pumped through the third and fourth exchangers. The sulfite reduces the iodine to nonvolatile iodide ion which makes the solution act as a sink for that element.

A nitrogen gas acceptor stream in the final exchanger is recirculated through a cryogenic separation system which, as known in the art, recovers the remaining valuable radioaotive inert gas components (radon/krypton/xenon) for eventual sale as byproducts.

DETAILED DESCRIPTION OF THE EMBODIMENT

Figure 1:
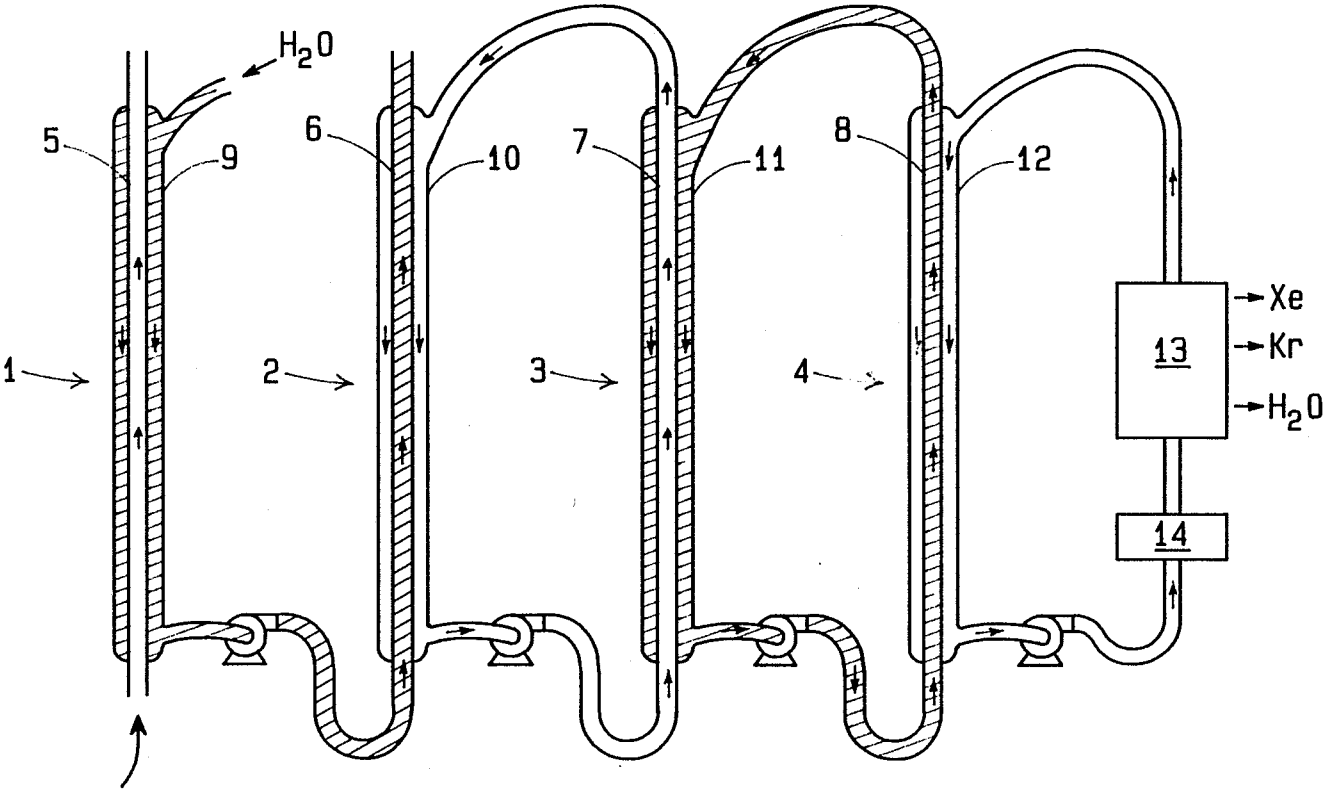
FIG. 1 is a schematic showing the countercurrent extraction of the gaseous elements from an effluent according to the subject invention.

Referring now to the drawing, there is shown a countercurrent extraction apparatus comprised of four tube-in-shell assemblies 1, 2, 3, and 4, each of which may be anywhere from one to thirty meters long. In actual industrial practice, each of these exchangers may be comprised of as many paralleled individual tube-in-shell exchangers as needed to provide the necessary gas handling capacity. Each individual tube-in-shell gas exchange assembly (1, 2, 3, and 4) has an impermeable polytetrafluoroethylene (PTFE) tubing shell of approximately 2 mm ID surrounding a microporous PTFE tube having an outside diameter of approximately 1.5 mm. The inner tube is permeable to all gases but does not permit the passage of aqueous liquids. A microporous PTFE tubing having a porosity of 30% to 70% with a pore size of approximately 1 to 3.5 μm have been found suitable for use with the subject invention. Preferably, microporous PTFE tubing with a 1 mm ID, wall thickness of 0.4 mm and a porosity of 50% with a maximum pore size of 2.0 μm has been found to work best. Tubing suitable for this application is available under the trademark, "Goretex" from W. L. Gore and Associates, Inc., Elkton, Md.

In the first tube-in-shell apparatus 1, the off gas effluent [typically largely comprised of $H_2$ and $N_2$, much smaller amounts of nitrogen oxides (NO and/or $NO_2$ at concentrations ranging from virtually zero to a few percent of the gas stream) and trace levels of radioactive iodine and inert gases] passes up the first porous tube 5 while a stream of pure water passes countercurrently down shell 9. Virtually all of the trace gases and the nitrogen oxides transfer to the aqueous stream through the porous wall of tube 5. However, the bulk of the $N_2$ and $H_2$ is not transferred to the aqueous stream because of their finite solubility in the limited volume of the aqueous phase. The absorbed $NO_2$ reacts with the water to form nitric acid and nitrous acid. Some fraction of the nitrous acid may then disproportionate to form more nitric acid and NO gas at a stoichiometric ratio of approximately 1:2.

The aqueous stream then passes up tube 6 in the second tube-in-shell exchanger 2 and a countercurrent flow of an extractant gas (e.g., nitrogen, helium, or hydrogen) is passed down the shell 10 of the same exchanger. That fraction of the $NO_2$ originally absorbed by the water flow and which reacted to form nitric acid is discarded along with the water at the raffinate exit at the top of tube 6.

The volatile iodine, NO, and the inert gases dissolved in that solution are quantitatively transferred to the extractant gas stream which is itself continuously looped/recycled between shell 10 of exchanger 2 and tube 7 of exchanger 3. In the third exchanger, the gases are transferred from the extractant gas stream to a aqueous stream containing a reductant such as sodium sulfite. The reductant is pumped in a continuous loop comprised of the shell 11 of exchanger 3 and the tube 8 of exchanger 4 and forms a sink for the iodine, which is reduced to nonvolatile iodide ion by the reductant solution. The reductant may comprise a sodium sulfite solution as stated; sodium bisulfite or sodium metabisulfite may also be used. Periodically a portion of the aqueous stream can be removed and the radioactive iodide precipitated with silver nitrate to form a more compact and chemically stable waste form.

In exchanger 4, the inert gases and NO in the reductant solution are transferred to another extractant gas stream which is continuously cycled between shell 12 of exchanger 4 and a cryogenic separation system 13 preceded by a rhodium catalyst bed 14. The catalyst bed 14 decomposes NO to elemental oxygen and elemental nitrogen and the cryogenic separation system separates the valuable radioactive inert gases from the nitrogen, oxygen, and water vapor. The cryogenic separator used may be any of those commonly available for separating gases through exposure to variable low temperatures. One such apparatus is the "Rare Gas Plant" at the Idaho National Engineering Laboratory. The rhodium catalyst bed comprises a bed of rhodium-coated alumina, although any other means of separating the NO from the gas stream may be used. Other means of separating the gases and decomposing the NO may be utilized as well.

When sufficient radioactive iodine has accumulated in the aqueous reductant stream, a portion of the solution can be removed and the iodine removed by precipitation with a silver salt such as $AgNO_3$ or the like and thereby converted to a stable and compact solid waste form.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, by that the invention will include all embodiments and equivalents falling within the scope of the appended claims.

Various features of the invention are set forth in the following claims.

We claim:

1. A process for separating gaseous elements including iodine, xenon, krypton, and radon from a gaseous effluent in the presence of oxides of nitrogen comprising:

passing said gaseous effluent across a gas-permeable membrane into an aqueous flow to transfer said elements and said oxides of nitrogen into said aqueous flow;

passing said aqueous flow across a second gas-permeable membrane against a flow of a first extractant gas to selectively transfer the gaseous elements to said first extractant gas;

flowing said first extractant gas with the transferred gaseous elements across a third gas-permeable membrane into a flow of reductant solution to transfer said gaseous elements and to convert iodine to an iodide;

flowing said reductant solution with said gaseous elements and said iodide across a fourth gas-permeable membrane into a second extractant gas to transfer xenon, radon, and krypton into said second extractant gas; and cryogenicly separating said xenon, radon, and krypton from said second extractant gas.

2. The process of claim 1 wherein said first extractant gas is selected from the group consisting of hydrogen, helium, and nitrogen.

3. The process of claim 1 wherein said reductant solution is selected from the group consisting of sodium sulfite, sodium bisulfite, and sodium metabisulfite.

4. The process of claim 1 wherein said membranes each comprise microporous polytetrafluoroethylene.

5. The process of claim 4 wherein said membranes have a porosity of 30% to 70% and a pore size of about 1 μm to 3.5 μm.

6. The process of claim 1 wherein said first extractant gas comprises hydrogen.

7. The process of claim 1 wherein said first extractant gas comprises helium.

8. The process of claim 1 wherein a catalytic bed converts NO to elemental nitrogen and elemental oxygen prior to the cryogenic separation.

9. A process for separating gaseous elements including iodine, xenon, krypton, and radon from a gaseous effluent in the presence of oxides of nitrogen comprising:

passing said gaseous effluent across a gas-permeable membrane of microporous polytetrafluoroethylene into an aqueous flow to transfer said elements and said oxides of nitrogen into said aqueous flow;

passing said aqueous flow across a second gas-permeable membrane of microporous polytetrafluoroethylene against a flow of a first extractant gas selected from the group consisting of helium, hydrogen, and nitrogen to selectively transfer the gaseous elements to said first extractant gas;

flowing said first extractant gas with the gaseous elements across a third gas-permeable membrane of microporous polytetrafluoroethylene into a flow of sodium sulfite solution to transfer the gaseous elements and to convert the iodine to the iodide;

flowing said sulfite solution with the gaseous elements and the iodide across a fourth gas-permeable membrane into a second extractant gas; and cryogenicly separating said xenon, radon, and krypton from said second extractant gas.

* * * * *